[11] 3,615,783

[72] Inventor  John Wilfred Howard
              164 North Shore Boulevard East,
              Burlington, Ontario, Canada
[21] Appl. No. 49,527
[22] Filed     June 24, 1970
[45] Patented  Oct. 26, 1971
              Continuation-in-part of application Ser. No.
              629,420, Apr. 10, 1967, now abandoned.

[54] HYDRAULIC CEMENT COMPOSITIONS
     10 Claims, No Drawings
[52] U.S. Cl. .................................................. 106/89,
                                              106/103, 106/117
[51] Int. Cl. ............................................. C04b 5/00,
                                                       C04b 7/14
[50] Field of Search ................................ 106/89, 97,
                                                  99, 103, 117

[56] References Cited
     UNITED STATES PATENTS

| | | | |
|---|---|---|---|
| 3,230,103 | 1/1966 | Minnick | 106/117 |
| 2,987,407 | 6/1961 | Ulfstedt et al. | 106/97 |
| 2,815,293 | 12/1957 | Randall et al. | 106/97 |
| 2,588,248 | 3/1952 | Klein | 61/36 |
| 2,046,142 | 6/1936 | Witty | 106/117 |
| 844,530 | 2/1907 | Mollenbruck | 106/93 |

OTHER REFERENCES

Taylor, W. H. " Concrete Technology and Practice," American Elsevier, p. 175 (1965).

*Primary Examiner*—Tobias E. Levow
*Assistant Examiner*—W. T. Scott
*Attorney*—Thomas B. Graham ABSTRACT: A hydraulic cement composition comprising a uniform, finely divided mixture of a Portland cement and mineral wool shot slag, the proportion of slag being from about 10 to 90 percent by weight of the mixture.

HYDRAULIC CEMENT COMPOSITIONS

RELATED APPLICATION

This application is a continuation-in-part of my copending application Ser. No. 629,420, filed Apr. 10, 1967 and now abandoned.

BACKGROUND OF THE INVENTION

Most concrete throughout the world is made with some form of fine and coarse aggregates such as sand and gravel respectively and some type of hydraulic cement, (the Portland cement being by far the most prevalent in England and America), water and frequently, in modern times, with one or more beneficial admixtures. The cements so used are termed "hydraulic cements" because the particles change profoundly in the presence of water so causing the cementing of the aggregates into a monolithic mass.

The strength of the mass after an appropriate time under favorable conditions, depends to a large extent on the "hydraulicity" of the cement—its ability to change particle-character in water. To be more specific, Portland cement is made from high lime content rock and clay or shale, pulverized and mixed. Neither of these ingredients has any hydraulicity even after pulverizing, until burned in a kiln and repulverized to suitable fineness, whereupon they become Portland cement. It will be noted that it is a product of an intense heat process; when hydrated later to enable it to form concrete, it liberates considerable heat in the transformation, and such heat, while it may be ignored, or be useful in much construction work, can be extremely troublesome in large masses of concrete from which the heat cannot escape as fast as it is generated, and therefore raises the temperature of the mass dangerously high. All cements vary with respect to each other in this tendency, and a "low heat" type must often be specified even at additional cost.

Iron blast furnace slag, if it has suitable chemical content, may be useful in making cement. It is a byproduct of the smelting process and, as discharged from the smelter, is a molten liquid comprising the nonmetallic elements of the iron ore and the lime rock which is necessarily added to the smelter as a "flux." Normally it cools in the air in a convenient dumping place, hardens and is known as "air-cooled hard iron blast furnace slag." It can be crushed into concrete aggregate and, being a product of heat, tends to make concrete heat resisting when used in such concrete as aggregates. It can also be ground and used largely or in some lesser proportion in place of lime rock as raw material in manufacture of Portland cement. It may be cooled more rapidly with the aid of water and so converted to "expanded" slag, useful in concrete as lightweight and insulating aggregate. It has no hydraulicity or cementitious properties in either form above. Except for its typical porosity it resembles somewhat natural rock and its particle structure is called "crystalline."

Over 100 years ago it was found that if slag were cooled with abnormal rapidity with the aid of water it would be converted to a more or less vitreous (glassy)state, and in so doing, formed into small particles resembling sand. This came to be generally known as "granulated" slag to differentiate it from air-cooled hard slag and it has little resemblance to hard slag pulverized to the same particle size, though it would have the same chemical content. Granulated slag was found capable of cementing itself into a mass if exposed to moisture and this was found to be due to what had to be termed the "latent" hydraulicity of the glass particles, inert in themselves but, activated by the element of free lime which was necessarily also present because the granulation process never produced an entirely vitreous product. The finer the particles the stronger the cementing action observed. Such material pulverized to a controlled fineness and proportioned with lime is called "Slag Cement."

Since the discovery of the latent cementitious properties of glassy slag, research scientists have been endeavoring to discover the best activators to realize its latent strength properties. The following are the main combinations of materials found successful in this connection:

1. What is called "Slag Cement" or "Slag Lime Cement" which is pulverized granulated slag comprising at least 60 percent by weight of the total with not more than 40 percent hydrated lime. It is defined substantially as above in the latest ASTM specification C595–68. It is relatively cheap, but needs to be very finely ground, and its strength requirements are the lowest of the various types of cement.

2. "Supersulfate Cement" is composed of 80–85 percent of granulated blast furnace slag, the remainder being calcium sulfate (gypsum) with a small amount of lime. It is capable of high-strength development, high resistance to sulfate-contaminated water, low heat of hydration, moderate resistance to acid and high resistance to attack by sea water.

3. "Portland Blast-Furnace Slag Cement" or "Portland Blast Furnace Cement" is defined in the latest ASTM specification C595–68 as: "The product of intimately intergrinding a mixture of Portland cement clinker and granulated blast furnace slag. The amount of granulated blast furnace slag used, is such that the slag constituent makes up between 25% and 65% of the Portland blast furnace slag cement by weight." A note to the foregoing addition adds, "The attainment of an intimate and uniform blend of Portland cement and fine granulated blast furnace slag is difficult. Consequently, adequate equipment and controls must be provided by the manufacturer. The purchaser should assure himself of the adequacy of the blending operation."

In the publication referred to above, granulated slag is defined as, "the nonmetallic product consisting essentially of silicates and alumino-silicates of calcium which is developed simultaneously with iron in a blast furnace and is produced by quenching the molten material in water or in water, steam and air."

Before considering the novel process which constitutes the present invention, U.S. Pat. No. 2,687,996 to Trief of Aug. 31, 1954 appears to suggest the grinding of granulated slag in the wet condition instead of dry as Portland cement is necessarily ground. It is repeated however that if slag be 100 percent pure glass and has not hydraulicity in itself, it could be ground wet, in distilled water without danger of hardening until later combined with the intended activator agent—having regard to the fact that hard water contains minute quantities of activator for slag. It would appear however that the Trief patent only teaches the principle of briqueting the ground wet slag so that the same may be preserved in storage for later use, whereas it could not be adequately preserved in wet storage as a slurry due to the danger of its hardening in a mass in the storage tank or silo. The reason for the danger of such hardening is that is cannot be depended upon to be pure glass. The normal granulation process as carried on at the blast furnace by quenching with water, rarely contains 100 percent glassiness; the residue normally contains free lime and it is the ideal activator, already placed in action in the presence of water before it is desired in action.

The present inventor is also cognizant of "The Chemistry of Cement and Concrete" by the highly respected authorities Sir Frederick M. Lea and C. H. Desch, in which it is stated that:

"The granulation of the blast furnace slag has been the subject of a large number of patents but the methods employed are usually quite simple. There are three main processes which have been used, water, steam and air granulation. In the water granulation process, the molten slag is allowed to run into a sheet-iron through into which a stream of water under high pressure is introduced. The slag is broken up into small particles and the mixture of slag and water is run into trucks with a perforated floor to allow the excess water to drain off. The success of the process depends on bringing the slag into contact with the water as soon as possible after it has left the furnace, and using a sufficiently rapid stream of water to granulate the slag immediately it enters the trough. A jet of water is often used to play on the slag just as it enters the trough. In another method the slag stream is run into a large tank of water and a jet of cold water arranged to play on it as it enters. The granulated slag is removed from the tank by bucket elevators. Various other methods, such as rotating steel drum onto which the slag impinges and water is sprayed, have also been used. There are also various special processes for the introduction of salts into the slag during granulation.

The water-granulated slag contains from 15 to 40 percent water and is dried in rotary driers by waste blast-furnace gases. The steam and air granulation processes have been used to avoid the high costs of drying the water-granulated slag. In one such process a jet of high-pressure steam impinges on the falling slag and effects the granulation. In another method the slag is run on to a revolving steel plate which is provided with steam jets. A revolving drum has also been used; the walls are water-cooled and the slag is projected against them by means of damp compressed air. The Buderus process utilized a combination of an air blast and a water spray which was so regulated as to produce a dry product.

The object of granulation is to obtain the slag in as glassy and non-crystalline condition as possible. Slags very high in lime require much more intensive cooling than those somewhat lower in lime, and a process which may work satisfactorily with one slag may not be sufficiently rapid in its effect to granulate another successfully. While the air and steam granulation processes have been used successfully on suitable slags, and the hydraulic properties are then equal to those of water-granulated slags, most works now use a water-granulation process."

SUMMARY OF THE INVENTION

It is the primary object of this invention to prepare a cement product which exhibits superior hydraulic cementitious properties.

It is a further object to utilize mineral wool shot slag in the preparation of this superior cement product, such slag having previously been recognized as useless for cement applications.

Various objects and advantages of this invention will become apparent from the following detailed description thereof.

The present invention consists of a method of producing a new hydraulic cement, useful in concrete and in masonry mortars, by utilizing the modified iron blast furnace slag available as a byproduct of the mineral wool manufacturing industry, in combination with conventional Portland cement. Such slag, by virtue of its modification, is decidedly more purely vitreous than it can otherwise normally be produced, and accordingly is capable of producing better cement than can conventional, unmodified iron blast furnace slag. The slag aforesaid which is a byproduct of the mineral wool manufacturing industry is modified by the addition thereto of silicon dioxide, and alumina or an oxide thereof so that it constitutes a slag with a ratio of silicon dioxide substantially higher than lime, and such has not previously been found useful for cement. From what has just been stated, it will be appreciated that the aforesaid byproduct, generally known as mineral wool shot or shot slag is in fact conventional iron blast furnace slag enriched by the just stated ingredients and proportionately impoverished in its lime content.

DESCRIPTION OF THE PREFERRED EMBODIMENT

For purposes of this invention, the term "modified slag cement" refers to hydraulic cement prepared either by blending finely divided modified slag with Portland cement or by intergrinding modified slag with Portland cement clinker to a finely divided state.

Although this specification will make reference to only one variety of Portland cement, it is to be noted that all commercially available Portland cements are applicable for use in the novel hydraulic cement compositions of this invention. Furthermore, the resulting cements exhibit improved properties regardless of the Portland cements utilized therein.

Mineral wool was formerly made from lime rock or dolomite. Within the last 25 years, however, slag has been used in its place. The byproduct of both the said dolomite, and slag has been considered useless and hence wasted according to the information of the present inventor. It has already been indicated that, essentially, mineral wool or bulk glass fiber is made from iron blast furnace slag resmelted with the addition of silicon dioxide and alumina or an oxide thereof in some way introduced whereby it is to be found in the mineral wool shot byproduct. In the manufacture of mineral wool, approximately half of the just-named product is produced from the volume of iron blast furnace slag smelted for the production thereof. The remaining half is the mineral wool shot or shot slag, whose virtue, in the manufacture of superior cements is herein recognized. The slag is propelled from the furnace under the influence of steam. The mineral wool fiber and the shot slag are air chilled during the course of propulsion from the furnace. The shot slag being globular (hence the name) is precipitated, while the acceptable mineral fiber remains airborne until picked up and collected for eventual use as "mineral wool." Apparently, what governs the potential hydraulic cementitiousness of slag is not its chemical composition primarily, but its vitreous state. This is believed by the inventor to depend partly upon the chemical composition, but largely upon the temperature of the melt, and promptness of its sudden chilling before an undesirable drop in the melt temperature occurs.

By analysis, mineral wool shot has been found to be constituted of the following ingredients in the following amounts: silicon dioxide ($SiO_2$) 42.10 percent; alumina ($Al_2O_3$) 9.11 percent; sulfur 0.64 percent; iron (in total) 0.55 percent; lime (CaO) 34.00 percent; magnesium oxide (MgO) 12.6 percent and manganese (Mn) 0.30 percent, approximately.

In view of all the foregoing the present invention should be recognized to reside in the usage of the byproduct most usually known as mineral wool shot, or shot slag, of the mineral wool insulation manufacturing process, for fine grinding of such slag into a material having latent hydraulic cementitious properties. Such slag, having an approximate ratio of 55:45 of silicon dioxide and lime respectively, has heretofore been universally recognized as useless for cement work but has been found by the inventor in contrast to all prior belief to have excellent latent hydraulic cementicity. The reason for this is somewhat obscure. Nevertheless it appears beyond reasonable doubt, to the inventor to be related to the glassiness of the shot slag, which is virtually 100 percent glass, the state always sought for and rarely attained as will have appeared from the foregoing discussion in the slag granulation industry.

As previously indicated, mineral wool shot slag is a new and different ingredient in the making of hydraulic cement such as is used in concrete and masonry mortars. It is a new use of a long-known substance produced in large quantities. It is the first and only use known for a substance hitherto thought useless.

Advantages consequent upon the discovery of a use, hence necessarily a new use, for mineral wool shot slag comprise:

1. the availability of an abundant new source useful in making hydraulic cement.
2. the ability to make a cement which while ground to appropriate fineness, and mixed with normal Portland cement, imparts superior hydraulic cementitious properties which the normal Portland cement alone does not possess.
3. The ability to store an ingredient for making normal Portland cement, for long periods either as raw material, or when fine ground without hardening, and indoors, or uncovered outdoors, since it is unaffected by aqueous media due to being virtually 100 percent glass, completely devoid of free lime, and hence having no cementitious properties in or of itself.
4. The possession, due to being high in silica, low in lime, and virtually free of tricalcium aluminate, of a lower heat hydration, and the ability to resist acid and sulfate attack better than do cements falling within conventionally accepted chemical content.

5. Conformity to all ASTM (American Society for Testing Materials) standards for hydraulic cement, including preeminent performance in the soundless autoclave expansion and contraction test, in which it had an expansion of only 0.04 percent.

6. The ability to make whiter concrete than does normal Portland cement without its inclusion, due to the absence of free iron in the ground mineral wool shot.

7. The ability with equivalent workability to permit the use of a lower water: cement ratio than does normal Portland cement, thus contributing to impermeability and durability as accepted in concrete technology.

8. The absence of regression in many tests, including blends with several different Portland cements, at all ages tested less than and in excess of 1 year.

9. Recognition of the practicability of deliberately manufacturing the slag now used primarily to manufacture mineral wool, for blending with hydraulic cement, having regard for the fact that the expensive steps required primarily to produce mineral wool would be eliminated, and the entire output of the blast furnace would be air-cooled, in contrast to the production of granulated slag which requires steam or water in its production, and consequent high drying and handling costs.

The slag and the Portland cement are blended into a dry mixture in which the proportions of said slag are between approximately 10 percent and 90 percent, by weight, of said mixture. It is noted that as little as a 10 percent slag modification on Portland cement provides a substantial increase in the strength of the mortar as contrasted with 100 percent Portland. Likewise, the fact that 100 percent modified slag without Portland was useless in strength development indicates that the modified slag requires some element of Portland to act as a catalyst in order to realize its cementitious properties.

The specific gravity of the modified slag is approximately 2.90 as compared with approximately 3.14 for Portland cement. This leads to the obvious conclusion that, when proportioned by weight, the blends of slag with Portland are relatively rich in the absolute volume of the cementitious factor. This produces the effect that when blended, for example, 50:50 slag to Portland by weight, the mixture is 4.25 percent richer in its blended cementitious component in terms of absolute volume of cementitious particles. Such an increase in cement in a mix of mortar or concrete would normally, if not accompanied by an increase in water requirement for a given consistency, produce an increase in compressive strength of 8 to 10 percent as has long been recognized by the law of the water cement ratio as laid down by Mr. Duff Abrams half a century ago. Accordingly, it is acknowledged that part of the superiority of the various blends of modified slag with Portland is attributable to this enrichment of the cementitious factor in the mix, but this in no way detracts from the virtue of the modified slag as it is purchased, as raw material, by weight, it is processed in grinding on the basis of cost per unit of weight and is blended in cement by weight.

All of the modified slag blends tend to retard the initial set of the mortar or concrete as compared with the setting time of Portland and the greater the proportion of slag the more pronounced is the retardation. Retardation of set is a desirable feature in cement in many situations as it provides an extension of time for workability and is sometimes provided with the aid of admixtures at extra cost. Accordingly, the blends which are richer in slag are primarily useful in this respect as well as being very attractive economically because of the lower cost of the slag.

All of the modified slag blends are significantly more workable than the equivalent mix with Portland only and the richer in proportion of slag the more pronounced is this superiority of workability.

The modified slag is present in the cements in a fineness ranging from about 2,000 to 7,630 Blaine, and preferably from about 4,500 to 5,600 Blaine. Inasmuch as the coarser grinds yield somewhat lower strengths than do the finer grinds, their use is generally limited to those situations where strictest economy is sought in production costs and where early strength is immaterial. Conversely, the very fine grinds are costly to produce and are utilized in situations where exceptionally high strengths are essential.

There are various curing techniques either for use in the laboratory or in commercial concrete construction practice, which are useful, convenient and favorable to the ultimate quality of the concrete. It is understood, of course, that we are referring to the concrete made with hydraulic cements, including the modified slag cement. Such techniques include:

a. Moist curing at lowered temperatures, from 73.4° F. down to approximately 40° F. Under this condition most hydraulic cements develop strength more slowly than at 73.4° F. but ultimately attain a higher level of strength and, in this respect, the modified slag cement proved by test to be no exception.

b. Moist curing at elevated temperatures (and at atmospheric pressures) from 73.4° F. to 212° F. as is often employed in precast concrete industries, the usual temperature range being from 150° to 200° F. In this case, the concrete develops strength much more rapidly than at lower temperatures but seldom attains as high a level of ultimate strength as it does with cooler curing. Again the modified slag cement proved by test to conform generally to the behavior of other hydraulic cements.

c. Dry curing at ordinary temperatures has virtually never been found favorable to strength development of any hydraulic cement. It normally accelerates early strength development but sharply inhibits ultimate strength as compared with moist curing. The modified slag cement also conforms in this respect, it being capable of strength development in a dry environment but at a significantly lower level than it is capable of in moisture. It actually exceeds Portland cement in dry curing but does not exceed it by as great a margin as it does in moisture, compared with Portland also cured in moisture.

d. Autoclave curing is the method of curing in steam at elevated temperatures and elevated pressures in pressure vessels. While the practitioner may select the temperatures and pressures best suited to his needs and his particular cement system, 365° F. at 150 p.s.i. steam pressure for a duration of 5½ hours is typical for testing purposes while lower temperatures (350° to 360° F.) with proportionately lower pressures (140 to 148 p.s.i.) and sometimes for shorter duration (3½ to 4½ hours) are usually employed in the concrete block industry. It is a standard method of curing to which all hydraulic cements are expected to react favorably, including the Portland Blast Furnace Slag type of cements.

The latter autoclave-curing technique represents a novel departure from typical cement curing procedures. Thus, such a technique enhances the compression strength of the resulting cements. Furthermore, the modified slag blends with from 45 to 90 percent slag provide a very useful cementitious binder for autoclaved concrete products and at a considerable cost-saving over Portland cement.

The following examples will further illustrate the embodiments of this invention.

EXAMPLE I

This example illustrates the advisability of adhering to the slag concentrations specified herein in preparing the operative hydraulic cements of this invention.

Hydraulic cements were prepared by uniformly blending 5,440 Blaine fineness modified mineral wool shot slag with normal (ASTM Type I) Portland cement in a variety of component proportions. Test specimens of each of the cement blends were formed into 2-inch mortar cubes and cured by a moist curing technique conducted at 73.4° F. The compressive strength of the sample cubes were determined at various intervals of moist curing by means of ASTM Test C-109.

The results of these determinations are presented in the following table:

TABLE I

| % by weight of Modified Slag | Compressive Strength (p.s.i.) at Moist Curing Interval of | | | |
|---|---|---|---|---|
| | 3 days | 7 days | 28 days | 3 mos. |
| 0% (i.e. 100% Portland) | 2,770 | 3,670 | 4,830 | 5,630 |
| 10 | 2,930 | 3,890 | 5,380 | 6,520 |
| 20 | 2,750 | 3,770 | 6,030 | 7,150 |
| 30 | 2,360 | 3,620 | 6,240 | 7,730 |
| 40 | 2,130 | 3,530 | 6,760 | 8,140 |
| 50 | 1,780 | 3,150 | 6,910 | 8,890 |
| 60 | 1,440 | 2,900 | 7,000 | 9,060 |
| 70 | 1,120 | 2,670 | 6,810 | 8,810 |
| 80 | 775 | 2,140 | 6,280 | 7,450 |
| 100% Slag, no Portland | 000 | (No Strength, Test Abandoned) | | |

The results presented above clearly indicate the wide range of slag concentrations which are useful in preparing improved hydraulic cements in accordance with this invention.

EXAMPLE II

This example illustrates the wide range of slag grinds which are applicable to this invention.

Hydraulic cements were prepared by blending modified mineral wool shot slag of various Blaine fineness with normal ASTM Type I) Portland cement in a 50:50 weight component ratio. The compressive strength of the resulting cements were then determined according to the procedure set forth in example I, hereinabove.

The results of these determinations are presented in the following table:

TABLE II

| Blaine fitness of Modified Slag | Compressive Strength (p.s.i.) at Moist Curing Interval of | | | |
|---|---|---|---|---|
| | 3 days | 7 days | 28 days | 3 mos. |
| 2,000 | 670 | 1,110 | 2,140 | |
| 2,470 | 1,000 | 1,680 | 3,400 | |
| 3,100 | 1,530 | 2,840 | 6,550 | |
| 3,620 | 1,510 | 2,600 | 5,530 | 7,410 |
| 4,000 | 1,580 | 2,750 | 5,720 | 6,980 |
| 4,540 | 1,610 | 3,070 | 6,510 | 8,350 |
| 4,990 | 1,730 | 3,120 | 6,770 | 8,770 |
| 5,450 | 1,830 | 3,340 | 7,350 | 9,020 |
| 5,880 | 1,880 | 3,600 | 7,660 | 9,570 |
| 6,420 | 2,010 | 3,750 | 8,330 | 9,980 |
| 6,970 | 2,100 | 3,950 | 8,470 | 10,550 |
| 7,500 | 2,380 | 4,600 | 9,020 | 10,560 |
| 7,630 | 2,600 | 4,650 | 9,150 | 10,570 |

The results presented above clearly illustrate the wide variety of slag grinds which are useful in preparing improved hydraulic cements in accordance with this invention.

EXAMPLE III

This example illustrates the novel autoclave-curing technique of this invention.

Hydraulic cements were prepared by uniformly blending 5,400 Blaine Fineness modified mineral wool shot slag with normal (ASTM Type I) Portland cement in a variety of component proportions. The compressive strength of the resulting cements were then determined according to the procedure set forth in example I with the exception that the mortar samples were cured by being autoclaved for a period of 5½ hours at a temperature of 365° F. and a pressure of 150 p.s.i.

The results of these determinations are presented in the following table:

TABLE III

| %, by weight, of modified slag | Compressive strength (p.s.i.) |
|---|---|
| 0% (i.e. 100% Portland) | 4,390 |
| 45 | 7,200 |
| 60 | 6,260 |
| 65 | 6,260 |
| 70 | 6,560 |
| 75 | 8,800 |
| 80 | 7,310 |
| 85 | 7,900 |
| 100 (all slag, no Portland) | 000 (no strength) |

The results summarized above clearly illustrate the general applicability of this novel autoclave-curing technique.

The above described procedure was then repeated with the exception that 4,800 Blaine fineness slag was substituted for the 5,400 Blaine fineness slag utilized therein. The properties of the resulting cement, and particularly the strength, were comparable to those of the cement prepared with the finer grind slag.

Summarizing, it is seen that this invention provides novel, high-performance hydraulic cement compositions. Variations may be made in proportions, procedures and materials without departing from the scope of this invention as defined by the following claims.

What is claimed is:

1. A composition of matter which consisting essentially of a uniform mixture of Portland cement and mineral wool shot slag all reduced to a finely divided state, in which the mineral wool shot slag acts as a cement upon hydration of the mixture, the proportion of slag being from about 10 to 90 percent by weight, of the mixture and the ratio of silicon dioxide being substantially higher than lime in said slag.

2. The composition of claim 1, wherein the proportion of slag in said mixture ranges from about 25 to 65 percent, by weight.

3. The composition of claim 1, wherein the silicon dioxide:lime ratio in said slag is 55:45.

4. The composition of claim 1, wherein the slag present in the mixture has a 2,000 to 7,630 Blaine fineness.

5. A process for the production of a hydraulic cement product which comprises the steps of
   1. uniformly and intimately blending finely ground mineral wool shot slag with Portland cement, said slag being present in the mixture in a concentration of from about 10 percent to 90 percent, by weight, and having the ratio of silicon dioxide substantially higher than lime therein;
   2. hydrating the dry mixture with water;
   3. casting the hydrated cement into a mold; and
   4. curing the cast cement by subjecting it to steam at elevated temperatures and pressures in a pressure vessel.

6. The process of claim 5, wherein the proportion of slag in said mixture ranges from about 25 to 65 percent, by weight.

7. The process of claim 5, wherein the silicon dioxide:lime ratio in said slag is 55:45.

8. The process of claim 5, wherein the slag present in the mixture has a 2,000 to 7,630 Blaine fineness.

9. The process of claim 5, wherein the curing step is conducted at temperatures ranging from about 350° to 370° F., and at pressures ranging from about 140 to 155 pounds per square inch.

10. The process of claim 5, wherein blending step (1) consists of intergrinding mineral wool shot slag with Portland Cement.

* * * * *